United States Patent
Israel et al.

(10) Patent No.: US 7,513,815 B2
(45) Date of Patent: Apr. 7, 2009

(54) OPTIMAL SILICON DIOXIDE PROTECTION LAYER THICKNESS FOR SILVER LAMP REFLECTOR

(75) Inventors: Rajasingh Israel, Westlake, OH (US); Ashfaqui Islam Chowdhury, Mayfield Hts., OH (US); Tianji Zhao, Mayfield Hts., OH (US)

(73) Assignee: General Electric Company, Schenectady, NY (US)

( * ) Notice: Subject to any disclaimer, the term of this patent is extended or adjusted under 35 U.S.C. 154(b) by 1003 days.

(21) Appl. No.: 10/633,085

(22) Filed: Aug. 1, 2003

(65) Prior Publication Data

US 2006/0007677 A1 Jan. 12, 2006

Related U.S. Application Data

(60) Continuation-in-part of application No. 10/098,772, filed on Mar. 14, 2002, now Pat. No. 6,773,141, which is a division of application No. 09/471,354, filed on Dec. 23, 1999, now Pat. No. 6,382,816.

(51) Int. Cl.
  *H01J 9/00* (2006.01)
  *H01J 5/16* (2006.01)
(52) U.S. Cl. .......................... 445/26; 313/110; 313/113
(58) Field of Classification Search .................. 445/26; 313/112–113, 310, 311, 110, 479, 635; 362/257, 362/296, 310, 341, 343, 635
See application file for complete search history.

(56) References Cited

U.S. PATENT DOCUMENTS

| | | | |
|---|---|---|---|
| 3,010,045 A | 11/1961 | Plagge et al. | |
| 3,687,713 A * | 8/1972 | Adams | 428/623 |
| 4,009,947 A | 3/1977 | Nishida et al. | |
| 4,160,929 A | 7/1979 | Thorington et al. | |
| 4,211,803 A | 7/1980 | Cowher et al. | |
| 4,238,704 A | 12/1980 | Bonk et al. | |
| 4,272,588 A | 6/1981 | Yoldas et al. | |
| 4,346,324 A | 8/1982 | Yoldas | |
| 4,425,606 A | 1/1984 | Shanks et al. | |
| 4,435,445 A | 3/1984 | Allred et al. | |
| 4,448,855 A | 5/1984 | Senaha et al. | |
| 4,467,238 A | 8/1984 | Silverstein et al. | |

(Continued)

OTHER PUBLICATIONS

D. K. Burge, et al., "Effect of Atmospheric Exposure on the Infrared Reflectance of Silvered Mirrors With and Without Protective Coatings," Applied Optic, vol. 12, No. 1, pp. 42-47 (1973).

(Continued)

*Primary Examiner*—Nimeshkumar D. Patel
*Assistant Examiner*—Anne M Hines
(74) *Attorney, Agent, or Firm*—Fay Sharpe LLP

(57) ABSTRACT

A reflector lamp has a generally parabolic shaped housing (12) with an interior surface coated with a layer (14) of silver having a protective layer (16) of a stable protective material, such as silica, disposed thereon. The thickness of the protective layer is selected such that at least one of the following relationships is satisfied: a color correction temperature of the lamp is no less than about 60 K below that of the light source, and a % reflectance of the reflective interior surface is no less than about 3% below that of an equivalent reflective interior surface without the protective layer.

21 Claims, 4 Drawing Sheets

U.S. PATENT DOCUMENTS

| | | | |
|---|---|---|---|
| 4,482,209 A | 11/1984 | Grewal et al. | |
| 4,508,054 A | 4/1985 | Baumberger et al. | |
| 4,547,432 A | 10/1985 | Pitts et al. | |
| 4,685,110 A | 8/1987 | DeBell et al. | |
| 4,701,663 A | 10/1987 | Kawakatsu et al. | |
| 4,959,583 A * | 9/1990 | Arsena et al. | 313/113 |
| 4,987,343 A | 1/1991 | Kosmatka et al. | |
| 5,076,663 A | 12/1991 | Arendt et al. | |
| 5,143,445 A | 9/1992 | Bateman et al. | |
| 5,177,396 A | 1/1993 | Geilen et al. | |
| 5,440,469 A | 8/1995 | Gomes | |
| 5,825,565 A | 10/1998 | Papenburg et al. | |
| 6,146,002 A | 11/2000 | Danapilis et al. | |
| 6,382,816 B1 | 5/2002 | Zhao et al. | |
| 6,416,194 B1 | 7/2002 | Demiryont | |

OTHER PUBLICATIONS

Gulino, et al., "Chemical Vapor Deposited Silica Coatings for Solar Mirror Protection," Prepared for 26th Aerospace Sciences Meeting sponsored by the American Institute of Aeronautics and Astronautics, Reno, Nevada, pp. 1-8 (Jan. 1988).

G. Hass, et al., "Reflectance and durability of Ag mirrors coated with thin layers of $Al_2O_3$ plus reactively deposited silicon oxide," Applied Optics, vol. 14, No. 11, pp. 2639-2644 (1975).

Elvedin Sirbegovic et al., "An Investigation of the durability of front surface Ag mirrors using oxide protecting layers," Vacuum, vol. 43, No. 5-7, pp. 763-765 (1992).

P. Hollingsworth Smith and H. Gurev, "Slicon Dioxide as a High Temperature Stabilizer for Silver Films*," *Thin Solid Films*, 45, pp. 159-168 (1977).

* cited by examiner

OPTIMAL SILICON DIOXIDE PROTECTION LAYER THICKNESS FOR SILVER LAMP REFLECTOR

This application claims the benefit as a Continuation-in-Part of U.S. application Ser. No. 10/098,772, which was filed on Mar. 14, 2002, now U.S. Pat. No. 6,773,141, and of U.S. application Ser. No. 09/471,354, filed Dec. 23, 1999, now U.S. Pat. No. 6,382,816, of which application Ser. No. 10/098,772 is a Divisional, the specifications of which are incorporated herein in their entireties by reference.

BACKGROUND OF THE INVENTION

This invention relates to the lamp arts. More particularly, this invention relates to a reflector coating and a method of preparation thereof for use in reflector lamps wherein a light source is contained in a housing having a transparent section and a reflective section, the reflective section being positioned to reflect a preponderance of generated light through the transparent section.

Reflector lamps are widely used in spot lighting, head lamps, and the like. Examples of typical reflector lamps include General Electric's PAR 38 and PAR 64 lamps. PAR is the commonly accepted acronym for "parabolic aluminized reflector." Other commercially available reflector lamps are described in U.S. Pat. Nos. 3,010,045; 4,021,659; 4,804,878; 4,833,576; 4,855,634; and, 4,959,583.

A recent area of emphasis in reflector lamp design has been to increase energy efficiency. Energy efficiency is typically measured in the industry by reference to the lumens produced by the lamp per watt of electricity input to the lamp (LPW). Obviously, a lamp having high LPW is more efficient than a comparative lamp demonstrating a low LPW. In this regard, it is expected that governmental regulations will require a significant improvement in reflector lamp LPW in the near future.

One of the most commonly used reflector coatings is aluminum film, which is deposited on the surface of a reflector by thermal evaporation and sputtering. Manufacture costs are low and the film is stable at lamp operating temperatures over the life of the lamp. Reflectivities of the film in the visible spectrum are about 88-90%, such that PAR 38 lamps incorporating the aluminum films are able to convert about 70% of the light emitted from the lamp filament tube to luminous output.

Silver films have a higher reflectivity and are used in optics, electronics, and in lighting. For the same PAR 38 example, silver-coated lamps reflectance is about 95-98%, thus the lamps are typically convert about 80-85% of the light emitted from the lamp filament tube to luminous output, a 15% lumen gain is thus expected.

Conventional manufacturing methods for assembling lamps with aluminum films incorporate several high temperature processes, including pre-heating, tubulating, aluminizing, brazing, and sealing. In the preheating step, the reflector is heated to about 735° C. In the tubulating step, ferrules and an exhaust tube are welded to the base of the reflector. The reflector is then aluminized to provide the aluminum coating. Brazing involves the welding of the light source to the ferrules. In the sealing step, a transparent cover lens is sealed over the reflector opening. Typically, an open natural gas and oxygen flame is used to carry out many of these heating steps. The flame heats adjacent portions of the reflector to high temperatures. In sealing, for example, the reflector and coating are subjected to a temperature of around 1000 ° C. in the seal region, and around 650° C. away from the seal.

Silver films may be prepared in a similar manner to the aluminum films. However, evaporated or sputtered silver films are notoriously unstable at temperatures in excess of 200° C. Silver films are readily oxidized at the temperatures used in sealing and the optical properties of the films destroyed. Unprotected silver films are thus unsuited to lamp manufacture by such processes. Moreover, the films exhibit poor chemical resistance to sulfide tarnishing, and thus the properties of the unprotected films are destroyed on exposure to the atmosphere.

Accordingly, there is a need in this art to develop a more energy efficient reflector lamp, which maintains acceptable light temperatures, light colors, life, and compatibility with current hardware.

SUMMARY OF THE INVENTION

In an exemplary embodiment of the present invention, a method of forming a lamp is provided. The method includes providing a reflective interior surface including providing a layer of a reflective material, and providing a protective layer which protects the silver layer against oxidation and sulfide formation. The lamp is formed from the interior surface and a light source, the thickness of the layer being selected such that at least one of the following is satisfied: (a) a color correction temperature of the lamp is no less than the 40 K below a color correction temperature of the light source, and (b) a % reflectance of the reflective interior surface is no less than about 3% below that of an equivalent reflective interior surface without the protective layer in a visible spectral range of 400-800 nm.

In another exemplary embodiment of the present invention, a lamp is provided. The lamp includes a housing, a light source disposed within the housing, and a reflective coating on an interior surface of the housing. The reflective interior surface includes a layer of silver, and a protective layer disposed over the layer of silver, the protective layer having an optical thickness which satisfies the following relationship:

$$1.1(1+0.9n) \leq t_{OPT} \leq 1.4(1+0.9n), \text{ where n is an integer from 0 to 10.}$$

In another exemplary embodiment of the present invention, a method of forming a lamp is provided. The method includes providing a reflective surface which includes silver and covering the reflective surface with a protective layer which is light transmissive, the protective layer exhibiting an oscillating function when one of color correction temperature and percent reflectance is plotted against optical thickness for a lamp formed from the reflective surface and protective layer, the optical thickness of the protective layer being selected such that the following relationships are satisfied: the color correction temperature is no less than about 20 K below that corresponding to a protective layer optical thickness of zero, and the reflectance is no less than 3% below that corresponding to an optical thickness of zero.

One advantage of at least one embodiment of the present invention is the provision of a new and improved reflector lamp having superior LPW.

Another advantage of at least one embodiment of the present invention is the provision of a protective coating on a silver reflector.

Another advantage of at least one embodiment of the present invention is the provision a silicon dioxide coating of high transmissivity.

Another advantage of at least one embodiment of the present invention is the provision of a lamp with a color correction temperature which is not substantially lower than that of the light source which it houses.

Still further advantages of the present invention will become apparent to those of ordinary skill in the art upon reading and understanding the following detailed description of the preferred embodiments.

DETAILED DESCRIPTION OF THE INVENTION

Figure 1:
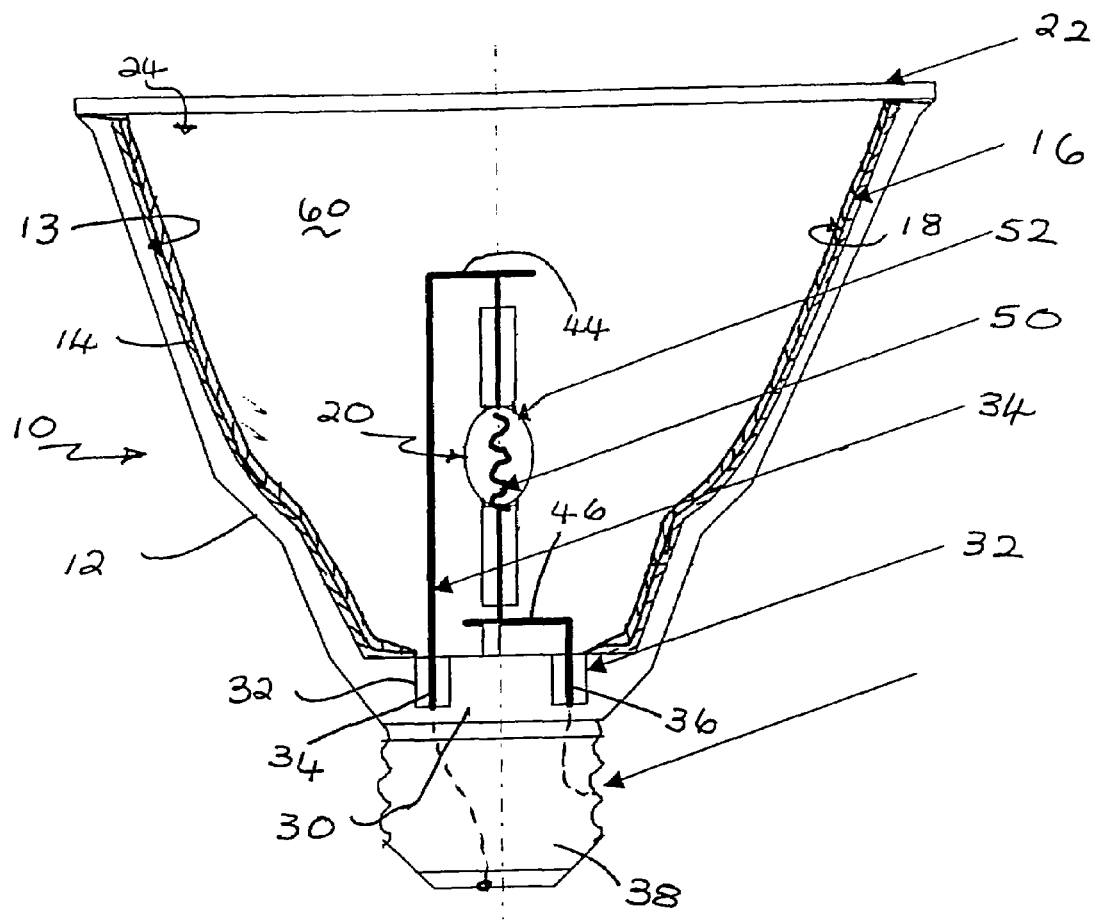
FIG. 1 is a cross-sectional view of an assembled incandescent lamp in accordance with the invention, showing a reflective layer and a protective layer (not to scale)

With reference to FIG. 1, a lamp 10 comprises a reflector housing 12 having an interior surface 13 on which is supported an interior reflective coating 14. The reflective coating 14 comprises a first, inner layer of reflective material 16, adjacent the housing, and a second, outer protective layer or topcoat 18, formed from a protective material, such as a stable oxide, which covers the reflective layer 16. The thickness of the protective layer 18 is optimized to maximize lamp performance, as is described in greater detail below.

The interior surface 13 of the housing 12 may be parabolic or elliptical, such as a PAR 30 or 38 lamp as shown in FIG. 1, or be of other suitable shape for directing light from a light source 20 positioned within the housing. A lens 22 covers an open end 24 of the housing. Lens 22 may be transparent to all light, may include a filter to absorb/reflect the light dispersed by the light source 20, and may include an anti-reflection coating to enhance light transmission.

A second, closed end 30 of reflector housing 12 includes two pass-through channels 32, which accommodate electrical connections for the light source. In the embodiment illustrated in FIG. 1, the electrical connections include leads or ferrules 34 and 36 which make electrical contact with a source of power (not shown) through a base 38 of the lamp. Leads 34 and 36 are in electrical connection with foils (not shown), respectively, which in turn are in electrical connection with leads 44 and 46. In this manner, electricity is provided to the light source 20, which in the illustrated embodiment includes a filament 50, such as a tungsten filament, enclosed with its own contained atmosphere within an envelope 52, formed from quartz, silica, or other suitable material. The atmosphere is a halogen fill typically comprising krypton and methyl bromide.

Although the illustrated light source is suited to use with the present coating, it will be appreciated that a variety of other light sources may replace the light source illustrated. These include light emitting diodes (LEDs) laser diodes, conventional incandescent lamps, quartz metal halide lamps, and ceramic metal halide lamps, and the like, alone, or in combination and/or multiples thereof.

The protective layer 18 is preferably one which is transparent or substantially transparent to light from the light source. It is of a suitable composition and thickness to protect the silver layer 16 from tarnishing or other degredative processes, both during assembly of the lamp 10 (such as during heat sealing of the lens to the housing) and also during the useful life of the lamp. Desirable properties of the protective layer include:

1) Compatibility with the reflective layer during coating and lamp making processes. In particular, it is desirable that there be little or no chemical reaction between the reflective layer and the protective layer.

2) Structural integrity—the protective layer is resistant to mechanical failure, both during the formation of the lamp and during its expected life.

3) Heat resistance—the protective layer is able to withstand thermal stresses placed on the protective layer, such as during heat sealing of the lens, and also during operation of the lamp. It is desirable for the protective layer to have a melting point which is substantially higher than the temperatures used for hermetically sealing the lamp.

4) Optical quality—the protective layer is transparent or substantially transparent in the visible region of the spectrum. The extinction coefficient of the protective layer is ideally zero, or as low as possible, for example about 0.001 or below. In one embodiment, the extinction coefficient is 0.00001, or below.

Suitable protective materials for forming the protective layer 18 include, but are not limited to, oxides, suboxides, carbonated compounds, hydrogenated compounds, fluorides, nitrides, sulfides, and mixtures and combinations thereof. Exemplary oxides, suboxides, carbonated compounds, and hydrogenated compounds include oxides, suboxides, carbonated compounds, and hydrogenated compounds of one or more of silicon, titanium, tantalum, zirconium, hafnium, niobium, aluminum, scandium, antimony, indium, yttrium, and the like, including silica ($SiO_2$), silicon monoxide, $TiO_2$, $Ta_2O_5$, $ZrO_2$, $HfO_2$, $Nb_2O_5$, $Al_2O_3$, $Sc_2O_3$, $Sb_2O_3$, $In_2O_3$, $Y_2O_3$, titanium tantalum oxide, and non-stoichiometric oxides of these materials. Exemplary fluorides include fluorides of one or more of magnesium, sodium, aluminum, yttrium, calcium, hafnium, lanthanum, ytterbium, and neodymium, and the like, including $MgF_2$, $Na_3AlF_6$, $YF_3$, $CaF_2$, $HfF_4$, $LaF_3$, $YbF_3$, and $NdF_3$. Exemplary nitrides include nitrides of one or more of silicon, aluminum, chromium, titanium, and the like including silicon nitride, chromium nitride, titanium nitride, aluminum nitride, and aluminum chromium nitride. Exemplary sulfides include zinc sulfide. Other materials of the type commonly used for forming dielectric thin films for dichroic coatings are also contemplated.

In one embodiment, the protective layer 18 comprises a layer of silica, which may be stoichiometric ($SiO_2$) or non stoichiometric. Silica is a stable oxide, which does not undergo chemical reaction with silver. Its melting point is 1700° C., which is several hundred degrees higher than temperatures used in sealing the lens to the housing (generally about 700-800° C.). It is effective at protecting silver at thicknesses of about 150 Angstroms (Å), or higher. It has good optical properties, and is a non-absorbing or substantially non-absorbing film in the visible light region of the electromagnetic spectrum. It is a safe material to handle, and can readily be applied by chemical vapor deposition, or other suitable application process.

In another embodiment, the protective coating layer 18 is formed from tantala ($Ta_2O_5$).

In one embodiment, the level of impurity in the protective layer 18 is less than 10%. In another embodiment, the impurity level is less than 1%, i.e., in the case of a silica protective layer, the layer comprises at least 99% silica.

The reflective layer 16 is preferably formed entirely or predominantly from silver, such as pure silver or silver alloy, although other reflective materials and combinations of reflective materials are also contemplated. In one embodiment, the level of impurity in the reflective layer is less than 10%. In another embodiment, the impurity level is less than 1%, i.e., in the case of a silver reflective layer, the layer comprises at least 99% silver. The reflective layer is preferably of sufficient thickness such that light is reflected from its surface rather than transmitted therethrough. In one embodiment, at least about 80% of the visible light which strikes the reflective layer is reflected therefrom and less than about 20% of the visible light is absorbed by or transmitted through the reflective layer. In a specific embodiment, at least 90% of the light is reflected. The thickness of the reflective layer can be from about 0.05 to about 1 microns in thickness. In one specific embodiment, the reflective layer is silver and is about 0.1 to 0.6 microns in thickness.

Although the reflective coating 14 has been described in terms of two layers, it is to be appreciated that the coating 14 may comprise additional layers. For example, an intermediate layer (not shown) is interposed between the silver layer 16 and the housing surface 13, such as a layer of chromium or nickel. Such an additional layer may be used to improve the adherence of the silver coating to the quartz or glass surface of the housing. Or, the intermediate layer may be used for other purposes, such as increasing the thickness of the reflective film to minimize the occurrence of pinhole openings in the film which allow light through to the rear of the housing. Additionally or alternatively, one or more layers may be interposed between the silver layer 16 and the protective layer 18, as described in U.S. Pat. No. 6,382,816.

The protective layer 18 is of sufficient thickness to protect the silver layer 16, both during lamp formation, and during its useful life. It is also optimized to provide reflector performance. Reflector performance may be expressed in two ways: a) as Corrected Color Temperature (CCT) loss or gain (relative to the color temperature of the light source, e.g., a tungsten filament without a (silver) reflective surface 16 and without a (silica) protective layer 18), and (b) as % reflectance (the percentage of visible light striking the reflective coating 14 which is reflected, rather than being absorbed or transmitted therethrough). Reflectance is related to lumen output (lumens per watt of power supplied to the lamp, LPW), the lumen output increasing as reflectance is increased. The reflector performance, as determined by both of these methods, initially decreases as the thickness of the silica protective coating increases. Thus, one way to improve reflector performance is to provide as thin a layer 18 as is possible to minimize this effect.

Figure 2:
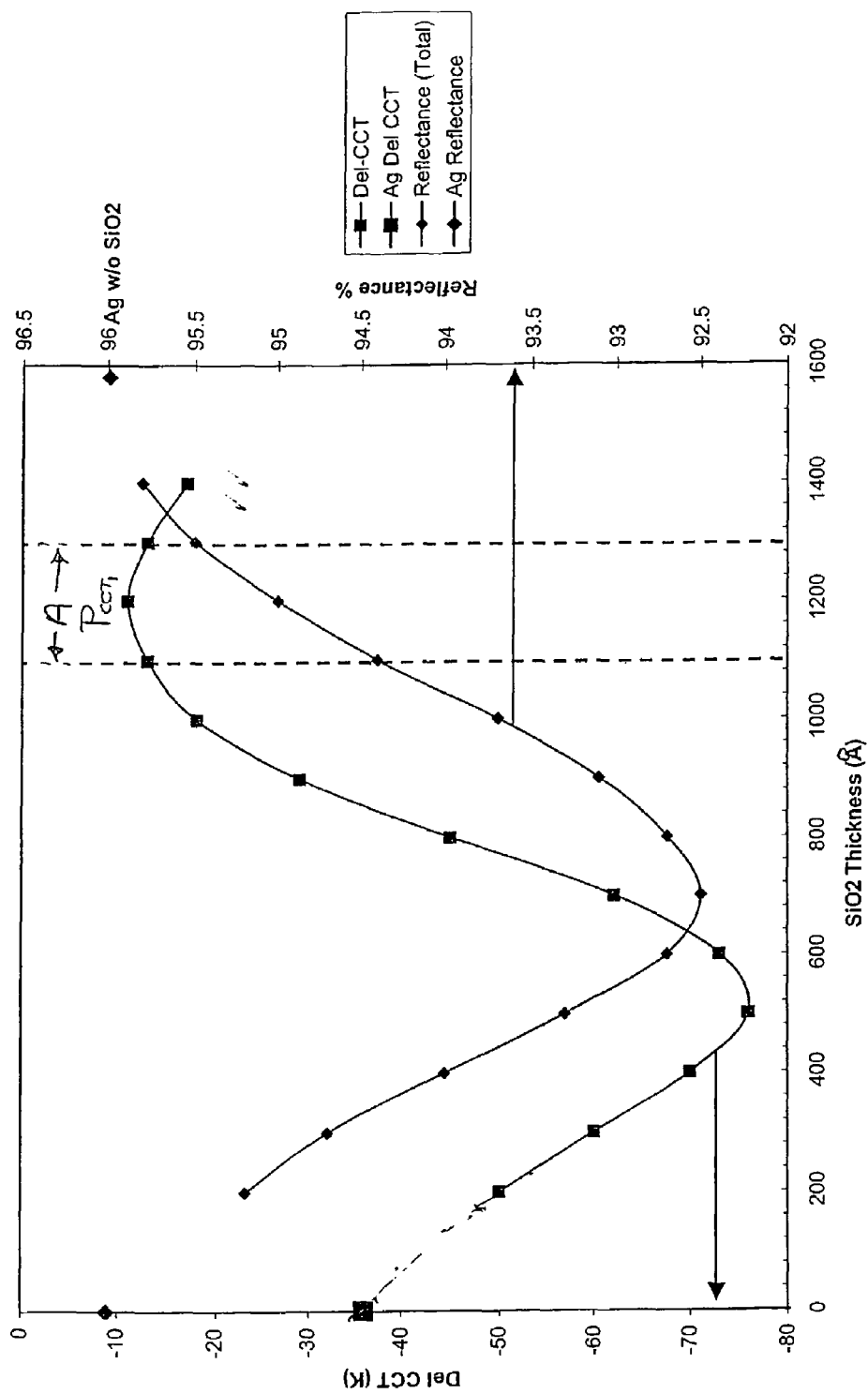
FIG. 2 is a plot of color correction temperature (CCT) (primary Y axis) vs. thickness of the protective layer and % reflectance (secondary Y axis) vs. thickness of the protective layer for a silica protective coating as produced by a chemical vapor deposition process.

The decrease in both CCT loss and % reflectance as the thickness of a silica protective layer 18 increases has been determined using a computer model, and is illustrated in FIG. 2. In this plot, the computer model has been programmed to predict the reflectance and color temperature for a double ended quartz (DEQ) PAR lamp which has a tungsten filament 50 with a color temperature of 2900 degrees in the Kelvin scale of temperature (K) and a silica layer 18 applied by chemical vapor deposition (CVD) over a silver reflective layer 16. Any color temperature loss or gain due to the protective coating thickness is plotted on the primary Y axis in FIGS. 2 and 3. For example, if no protective layer is used, the color temperature of a PAR 38 lamp with a DEQ lamp bulb is 2969 K (a CCT loss/gain of zero), which is marked at the origin of the primary Y-axis. The CCT intercept is not at zero, because the reflective silver coating reduces the CCT by about 36 K, due, in part, to the low reflectance in the blue region of the visible spectrum which is inherent in silver coatings. The CCT drop reaches a maximum at around 450-550 Å thick $SiO_2$.

Not all of the lumens from DEQ lamp bulb become face lumens of the PAR 38 lamp, in part because the reflectance of the reflective coating 14 is less than 100%. The reflectance is plotted on the secondary Y-axis as % reflectance. For example, when the thickness of the protective layer 18 is zero (i.e., no protective layer), the reflectance is 96%. That indicates that 96% of the spherical lumen becomes face lumen of the PAR 38 lamp.

As can be seen in FIG. 2, as the thickness of layer 18 increases from 0 to about 400 Å (0.04 microns), there is a steady drop in both % reflectance and CCT. The CCT, for example can drop by as much as 75 K-80 K which results in a noticeable yellowing of the light. By selecting a thickness as close to zero as possible, the reflectance and CCT can be maintained, at least in part. For example, the coating may be 50-300 Å. In one embodiment, the protective layer 18 is 100-200 Å in thickness. In one specific embodiment, the protective layer is 155-175 Å in thickness.

However, it is sometimes difficult to control the thickness of the layer 18 accurately with conventional coating techniques when thin (<200 Å) coatings are desired. Additionally, if the thickness is too low, it may not provide sufficient thickness for protection of the silver layer, either in lamp formation, or in subsequent use.

It has now been found that lamp performance exhibits a periodic, oscillating function, similar to a sine wave, in which, following a trough, the performance rises to a peak and then drops to a trough before rising to the next peak, and so forth. The protective layer 18 and silver reflective layer 16 form a light interference thin film system. For a given light source, such as a double ended quartz (DEQ) lamp inside a given reflector, such as a parabolic reflector, the total lumen output and the color temperature are a function of the protective layer thickness. This is shown in FIG. 2 for a silica protective layer 18 produced by chemical vapor deposition, and also in FIG. 3, for a silica protective layer 18 produced by Plasma Enhanced Chemical Vapor Deposition (PECVD, e.g., with a Leybold CVD coater) which expands the plot to two peaks and two troughs.

Because of this periodicity, it is possible to provide improved reflector performance by selecting a protective layer thickness in the range of any one of the periodic peaks. It will be noted that the peaks of the % reflectance (which have been denoted $P_{R1}$, $P_{R2}$, etc in sequence) do not coincide exactly with the peaks for CCT (which are denoted $P_{CCT1}$, $P_{CCT2}$, etc, in sequence). There is a phase difference between the peaks, with the reflectance peak somewhat behind the CCT peak. As a result, selecting a thickness of protective coating which would be optimal for CCT does not ensure the highest face lumens (a function of % reflectance).

Thus, if CCT loss is considered more important for the particular lamp applications, then it is desirable to choose a thickness in the range of one of the CCT peaks. In one embodiment, the protective layer thickness t is within the range of:

$$t = P_{CCTn} \pm 400 \text{ Angstroms} \quad \text{(Eqn. 1)}$$

where $P_{CCTn}$ is the thickness at CCT peak n, and where n is an integer from 0 to about 10 (e.g., n=0, 1, 2, 3, etc). In another embodiment, n is at least 1. In yet another embodiment, n is less than about 5.

In another embodiment, the protective layer thickness t is within the range of $P_{CCTn}\pm200$ Angstroms. In yet another embodiment, the protective layer thickness is within the range of $P_{CCTn}\pm100$ Angstroms (see range A in FIG. 2, between hatched lines, which corresponds to a silica thickness of 1100-1300 Angstroms. If % reflectance is considered more important, then a thickness in the range of one of the reflectance peaks ($P_{Rn}$) may be more appropriate, e.g., the thickness may be within the range of $P_{Rn}\pm400$ Angstroms. In one specific embodiment, the thickness is $P_{Rn}\pm200$ Angstroms and in another specific embodiment, the thickness of layer 18 is $P_{Rn}\pm100$ Angstroms. Since the periodicity is dependent on the refractive index of the material, other thicknesses can be determined by adding a thickness corresponding to the difference d between two peaks, which in the case of silica, is about 1800 Angstroms for both CCT and reflectance, i.e., $$P_{CCTn} \approx P_{CCT1} + d(n-1) \quad \text{(Eqn. 2)}$$

Similarly:

$$P_{Rn} \approx P_{R1} + d(n-1) \quad \text{(Eqn. 3)}$$

where d is the distance between two consecutive peaks, in Angstroms.

In the case of silica, these equations can be expressed as:

$$P_{CCTn} \approx 1100 + 1800(n-1) \text{ Angstroms, and}$$

$$P_{Rn} \approx 1600 + 1800(n-1) \text{ Angstroms.}$$

Where it is desirable to consider both of these parameters in the lamp's performance, then a protective layer 18 thickness which falls between the two peaks may be selected. For example, a thickness in the region of the intersection between the plots, such as in the region of intersection $I_1$ or $I_2$, may be appropriate. For example, the thickness may be within the range of:

$$t = I_n \pm 400 \text{ Angstroms} \quad \text{(Eqn. 4)}$$

where $I_n$ is the thickness at a CCT/reflectance plot intersection and n is an integer from 1 to 10. In one specific embodiment, the silica layer thickness t is within the range of $I_n \pm 200$ Angstroms. For example, in the case of silica, a thickness of 800 to 1600 ($I_1 \pm 400$ Angstroms) or 1000 to 1400 ($I_1 \pm 200$ Angstroms) may be selected. It will be appreciated that although the plots intersect twice between successive peaks, $I_n$ is the intersection which falls between the CCT and reflectance peaks, not the intersection between the respective troughs.

By carefully choosing the silica (or other protective layer 18) thickness, it is thus possible to maintain the CCT of the lamp at above a selected CCT loss. In one embodiment, the CCT loss is less than about −40 to −60 degrees Kelvin (K), from that of the PAR 38 lamp. For a PAR 38 lamp, which has an initial color temperature of 2969 K, this corresponds to a color temperature of 2909-2929K, or higher. In the case of silica deposited by PECVD as the protective layer, suitable thicknesses for achieving a CCT loss of less than about −40 K are from about 830 Angstroms to about 1720 Angstroms (i.e., within about ±400 Angstroms of the peak $P_{CCT1}$) and from about 2500 Angstroms to about 3400 Angstroms (in the case of peak $P_{CCT2}$). In one embodiment, the CCT loss is no more than −20 K, which corresponds to a color temperature of 2949 K in the illustrated embodiment. In the case of PECVD deposited silica as the protective layer, suitable thicknesses for achieving a CCT loss of −20 K, or less, are from about 850 Angstroms to about 1400 Angstroms (Peak $P_{CCT1}$) and from about 2600 Angstroms to about 3250 Angstroms (Peak $P_{CCT2}$) In another embodiment, the CCT loss is no greater than −10 K, corresponding to a color temperature of 2959 K. In the case of silica as the protective layer, suitable thicknesses for achieving a CCT loss of −10 K, or less are from about 930 Angstroms to about 1280 Angstroms (Peak $P_{CCT1}$) and from about 2680 Angstroms to about 3200 Angstroms (Peak $P_{CCT2}$). In another embodiment, the CCT loss is no greater than 0 K, corresponding to a color temperature of 2969 K. In the case of silica as the protective layer, suitable thicknesses for achieving a CCT loss of 0 K, or less are from about 2680 Angstroms to about 3120 Angstroms (Peak $P_{CCT2}$).

Figure 3:
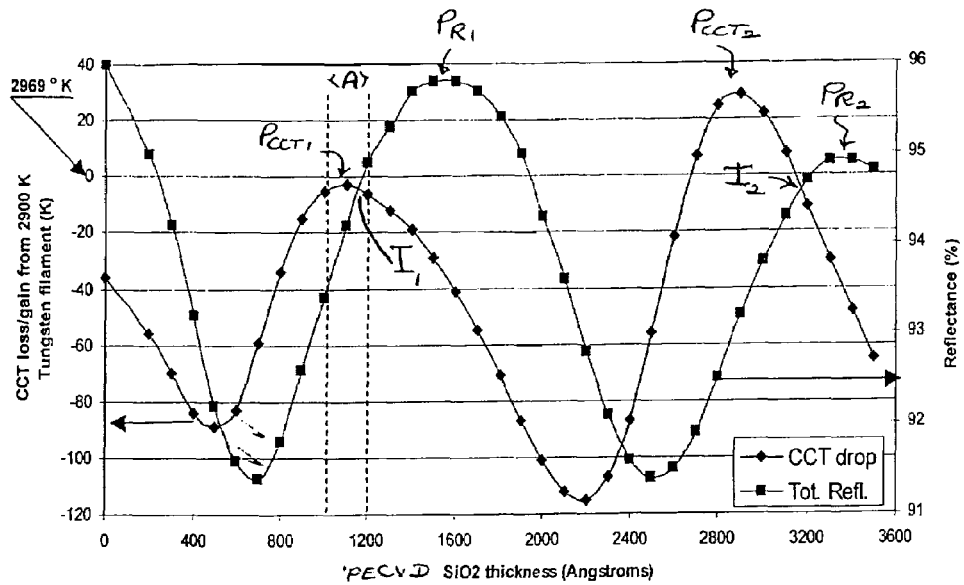
FIG. 3 is a plot showing CCT and % reflectance over a wider protective layer thickness range than that of FIG. 2 for a silica protective coating as produced by a Plasma Enhanced Chemical Vapor Deposition process.

It will be noted that the peaks and troughs in FIG. 3 do not correspond exactly to those illustrated in FIG. 2. This is because the deposition process used (PECVD in FIG. 3, CVD in FIG. 2) has a slight, but noticeable impact on the nature of the silica layer produced and its refractive index and absorption characteristics. The differences in refractive index can be accounted for by defining the thickness of the layer in terms of optical thickness, rather than physical thickness, as is described in greater detail below.

As can be seen from FIG. 3, by selecting a region in the second CCT peak, $P_{CCT2}$, the change in CCT is actually a gain. Thus, when it is desired to increase the color temperature of the lamp, a protective layer thickness in the range of peak $P_{CCT2}$ may be selected. Thicknesses in the range of third and subsequent peaks may also be selected—i.e., for $P_{CCTx}$, where x is an integer greater than 1. It should be noted that at higher silica thicknesses, the reflectance peak diminishes with each successive peak. This is true for all peaks because of the light interference and absorption due to the increased film thickness. In the case of silica, for example, the peak reflectance at $P_{R1}$ is greater than 95.5%, i.e. more than 95.5% of the spherical lumens from the DEQ lamp bulb become face lumens of the PAR lamp. At peak $P_{R2}$, the reflectance is less than 95%. Thus, there is some loss in reflectance, and hence lumen output, associated with choosing a protective layer thickness in the region of the second or subsequent peak.

In another embodiment, the lamp may be optimized for reflectance, for example, by selecting regions of the reflectance peak where the drop in reflectance is no greater than, for example 2.5% or 2% of the reflectance without a coating. In the case of a silica protective coating, this could be achieved by selecting a thickness which would achieve a reflectance of at least 93.5% or 94%, for example, by selecting a thickness of 0-350 Å (peak $P_{R0}$) or 1000-2100 Å (peak $P_{R1}$). In another embodiment, the reflectance loss is no greater than 1%.

The thickness of the protective layer 18, of course is always greater than 0 Å, and in one embodiment, is at least 50 Å, in another embodiment is at least 100 Å.

In one embodiment, two conditions are satisfied so that the lamp achieves both good CCT values and good reflectance, e.g., by selecting the thickness which corresponds to both a CCT loss which in one embodiment, is no greater than −20 K, and in another embodiment is no greater than 0 K, and a reflectance which, in one embodiment is no more than 3%, and in another embodiment, is no more than 2.5% below that of the reflectance of the lamp without a coating. In the case of silica, this corresponds to thicknesses roughly in the range of 1000 to 1400, and 1100-1400 Angstroms, respectively. This provides a good balance between both CCT and reflectance properties. The window A between the hatched lines in FIG. 3 roughly corresponds to silica thicknesses where the reflectance drop is no greater than 2.5% and the CCT loss is no greater than 6 K.

The thickness of the protective layer 18 should be lower than that at which it tends to fracture and spall during use.

Additionally, at high thickness, the coating 18 tends to become absorptive. Preferably, n is less than 10 in the above expressions. In one embodiment for a silica protective layer, the thickness of the protective layer is less than about 2600 Å. For practical purposes, however, most current coating systems are not readily capable of growing a silica coating of, for example 1000 Å. Some current coating equipment is unable to grow a silica coating of greater than about 200 Å.

While FIGS. 2 and 3 relate specifically to a PAR 38 lamp, the same modeling techniques can be applied to different lamps with different color temperature bulbs. In general, it has been found that the relationships defined in Equations 1-4 hold good for a variety of lamp reflector shapes, lamp bulb color temperatures, and protective layer materials.

It will be appreciated that the lamps in the illustrated embodiment emit light throughout the visible range (400-800 nm). It is also contemplated that the lamp emits light in only a narrow region of the visible spectrum, such as blue or green.

Figure 4:
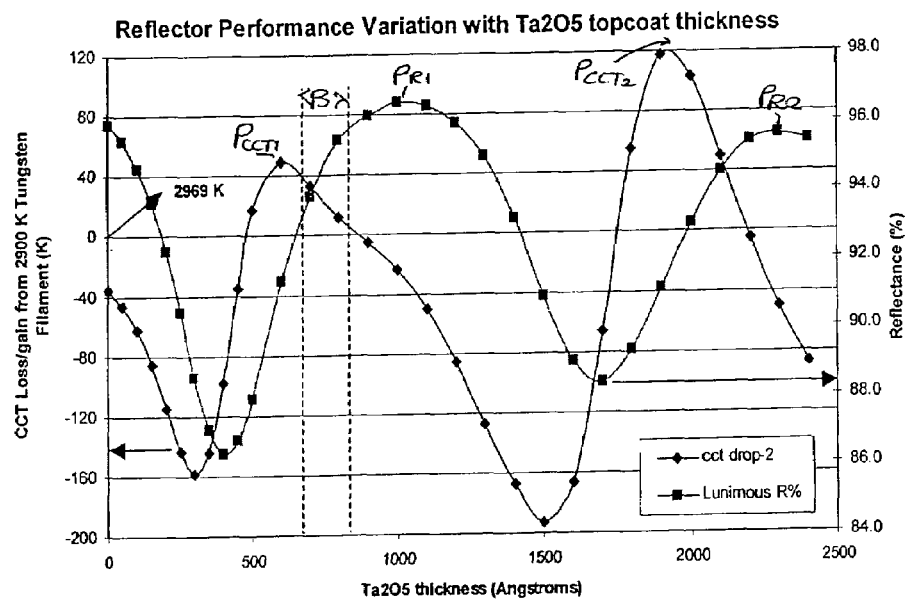
FIG. 4 shows plots of CCT and % reflectance vs. thickness for a $Ta_2O_5$ coating.

FIG. 4 shows an analogous plot for a lamp with a $Ta_2O_5$ protective layer in place of the silica layer of FIGS. 2 and 3. The temperature loss and reflectance curves have a periodic, sine-wave-type variation with thickness as does the silica coating. However, as can be seen, the thickness of the protective tantala coating which is suitable for providing a good CCT and or reflectance level is shifted downward, as compared with silica. For example, the second reflectance peak $P_{R2}$ occurs at about 2300 Å for tantala, as compared with 3400 Å in the case of silica. Additionally, the distance between the peaks is somewhat lower, about 1300 Å. These results are a function of the difference in refractive index R of the two materials: R=1.46 for silica and R=2.0 for tantala. Additionally, the amplitude of color temperature and reflectance is larger. For example, the temperature loss can be as large as 200 K when tantala is 1500 Å thick, and can gain 120 K at a thickness of about 2000 Å.

In the case of tantala an exemplary window of suitable thickness B for maintaining very good CCT and reflectance value (i.e., a reflectance drop of no greater than 2.5% and a CCT loss of no greater than 0 K), shown in between the hatched lines in FIG. 4, corresponds to 700 to 850 Å, which is of lower thickness than the corresponding window for silica. It is also somewhat narrower than the corresponding silica window which meets the same conditions.

It will be appreciated that corresponding windows can be identified on the second and subsequent peaks.

The reflective coating plus protective layer, can be considered as an optical interference film. Instead of defining the thickness of the coating in Angstroms, the thickness can be defined in terms of the optical thickness, which is the product of physical thickness and refractive index, i.e., $$\text{Optical thickness, } t_{OPT} = R \times t \qquad \text{(Eqn. 5)}$$

where t is the physical thickness (in Angstroms).

Figure 5:
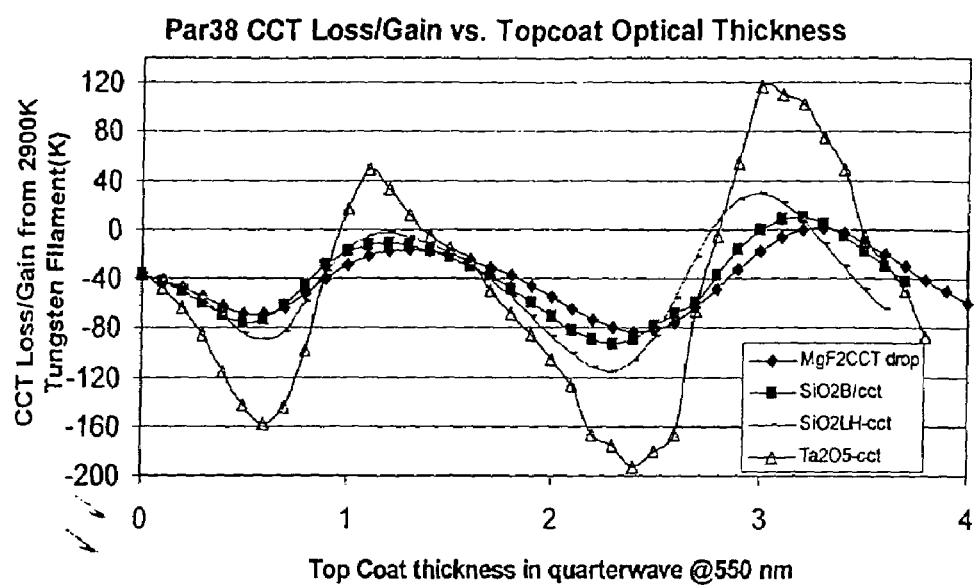
FIG. 5 is a plot of CCT vs. optical thickness for four protective coatings.

FIG. 5 shows a plot of Par lamp color temperature vs optical thickness of the protective layer, in quarterwaves at 550 nm (5500 Å-corresponding to green light, to which human eyes are particularly sensitive) for four different topcoats, labeled $MgF_2$ (magnesium fluoride), $SiO_2LH$ (a silica coating made on a Plasma Enhanced CVD coater), $SiO_2B$ (a silica coating made by a low pressure CVD process), and $Ta_2O_5$ (a tantala coating). It can be seen that the four coatings have peaks and valleys generally at corresponding optical thicknesses without significant phase differences.

Suitable ranges of protective coating optical thickness can thus be defined for any system as being where CCT loss is less than a specified value and where reflectance loss is less than a specified percent. For any selected peak, therefore, a suitable optical thickness (quarter waves) $t_{OPT}$ is defined by the expression:

$$L(1+n \times D) \leq t_{OPT} \leq H(1+n \times D) \qquad \text{(Eqn. 6)}$$

where L is the lowest optical thickness in quarterwaves in the first peak which satisfies the prescribed conditions, H is the highest optical thickness in quarterwaves in the first peak which satisfies the prescribed conditions, n is a integer from 0 to 10, corresponding to the peak, and D is the distance between peaks in quarterwaves, which can be seen in FIG. 5 to be about 0.9 quarterwave.

For example, where it is desired for the CCT drop to be no greater than -20 K and for the reflectance loss to be less than 2.5%, L is about 1.1 and H is about 1.4, so Eqn. 6 becomes $$1.1(1+0.9n) \leq t_{OPT} \leq 1.4(1+0.9n) \qquad \text{(Eqn. 7)}$$

Preferably, n is an integer from 0 to 5. The expressions of Equations 1-7 are valid for all wavelengths of light in the visible range of the spectrum, i.e., in the spectral range of 400-800 nm. The expressions may also hold for wavelengths in the IR and UV ranges of the electromagnetic spectrum.

The desirable thickness of the protective layer 18 is also dependent, to some degree, on the lamp forming process. Where the forming process is more aggressive, a thicker coating provides better protection for the underlying silver layer. In one embodiment, such as where a tungsten-halogen light source 20 includes a filament 50, which is housed in its own contained atmosphere within an envelope 50, the lens need not be hermetically sealed to the housing 12 to create a sealed space. Thus, the high temperatures (600° C. or higher) typically employed with flame sealing of the lens 22 to the housing 12 can be avoided. Moreover, in this instance, the lens 22 can be adhesively or otherwise secured to the reflector housing 12, since a hermetic seal is not required to preserve the filament integrity. By carrying out any tubulating steps, and any other steps where significant heat is applied to the lamp, prior to application of the coating, the coating is not subject to potential degradation of the coating during lamp formation, and thus the protective coating need only be of sufficient thickness to provide protection during the useful lifetime of the lamp. The silica, or other protective coating 18 of this embodiment protects the reflective silver coating 16 against sulfating of the silver and the resultant destruction of the reflective properties of the coating 16. Thus, the layer 18 can be relatively thin.

In another embodiment, the lens is flame sealed to the housing to create a hermetic chamber 60. The atmosphere or fill of chamber 60 preferably comprises at least one inert gas, such as krypton, helium, or nitrogen. The flame sealing step is carried out after the coating has been applied, thus the coating is subject to the temperatures used in flame sealing. This embodiment is suited to applications where the light source 20 does not include its own envelope and the sealed interior space 60 encloses the selected lamp atmosphere. The coating should be of sufficient thickness to avoid damage during flame sealing. As with the earlier embodiment, tubulation and other high temperature treatments are preferably carried out prior to applying the coating.

In one embodiment, the light generating filament 50 or other light source lies parallel to the central axis of the parabola defined by the inner surface of the housing with the filament 50 midpoint outward from the focus of the parabola. This reduces the amount of light reflectance occurring within the lamp and achieves more single reflection of light rays from the lens. This is beneficial because, even though silver is a more efficient reflector of light than polycrystalline aluminum, a certain portion of light energy is lost on each reflection. While a longitudinal filament 50 is preferred, it should be appreciated that the protected silver coating 14 may also be employed in lamps with a perpendicular filament.

The coating 14 is prepared in two steps, the first step being the deposition of the silver layer 16, the second comprising the deposition of the protective layer 18. Prior to applying the silver layer, the housing surface is cleaned, for example, by an oxygen plasma. Optionally, a buffer layer is deposited on the silver layer, i.e., between the first and seconds steps. The buffer layer may be a thin layer of silicon, tantalum, or the like (i.e., a reduced form of the element in the oxide protective layer), which helps protect the silver layer during deposition of the protective oxide. Its thickness may be between about 0.003 and 0.01 micrometers. The buffer layer becomes consumed as the oxide layer is applied.

In one embodiment, a layer of silver is first deposited on the interior surface of the glass or quartz housing 12 of the reflector to a thickness of between about 0.1 to 0.6 micrometers in thickness. In another embodiment, from 0.2 to 0.4 micrometers in thickness. The silver layer may be deposited by vacuum deposition methods, such as sputtering, Ion-Assisted-Deposition (IAD), physical vapor deposition (PVD), chemical vapor deposition (CVD), or by other known processes, such as thermal evaporation or dip coating. In one embodiment, a silver target is sputtered.

Magnetron sputtering is an alternative deposition method. In this process, a high energy inert gas plasma is used to bombard a target, such as silver. The sputtered atoms condense on the cold glass or quartz housing. DC (direct current) pulsed DC (40-400 KHz) or RF (radio frequency, 13.65 MHz) processes may be used, with RF or pulsed DC being preferred.

Ion assisted deposition is another method of depositing silver. An ion beam is used in combination with a deposition technique, such as PVD Electron beam evaporation. The ion beam (e.g., produced by a Kaufman Ion gun, available from Ion Tech Inc.) is used to bombard the surface of the deposited film during the deposition process. The ions compact the surface, filling in voids, which could otherwise fill with water vapor and damage the film during subsequent heating steps. This technique is relatively complex and more difficult to control than standard sputtering techniques.

The protective layer may be applied, for example, by similar methods in those described above. In one embodiment, a chemical vapor deposition (CVD) process, such as a low pressure CVD process, or by Plasma Enhanced Chemical Vapor Deposition (PECVD), such as with a coater available from Leybold, to the desired thickness. For example, a plasma derived from a $SiO_xC_yH_z$ compound, such as hexamethyl disiloxane, comprises Si, O, C, and H is used to deposit a silica layer. The proportions of H and C in the layer are low, typically each is less than 0.1-0.5%. Alternatively, a silica target is sputtered in oxygen.

Magnetron sputtering is another method of forming the protective layer. In this method, oxygen gas is first introduced to the vacuum chamber. Some of the oxygen is converted to ions. Sputtering of an element, such as silicon, is commenced. In the case of silicon, for example, the sputtered silicon combines with unreacted oxygen to form silica, which is deposited on the silver, or on the buffer layer, when used.

Where a buffer layer is used, it may be deposited on the silver layer by one of the methods discussed above for deposition of the silver layer. Sputtering is an exemplary method. For example, the silver target is replaced by a silicon target and a layer of silicon is sputtered on to the silver layer in the same deposition chamber.

U.S. Pat. Nos. 4,663,557; 4,833,576; 4,006,481; 4,211,803; 4,393,097; 4,435,445; 4,508,054; 4,565,747; and 4,775,203 all represent acceptable processes with which to deposit the silver, silica, and any other protective layer materials and are herein incorporated by reference.

Optionally, the lamp is subjected to an annealing process after deposition of the protective coating to help create a uniform layer which is free of voids. Annealing the protective layer may be carries out by heating the coated lamp housing to raise the temperature of the housing slowly, without cracking, to a suitable temperature, e.g., around 600-1000° C., for example, with a flame. The oxygen from the flame and from the surrounding air diffuses into the oxygen deficient protective layer, filling voids in the protective layer and increasing its density, resulting in increased reflectivity of the lamp.

The annealing step is readily avoided by selecting a protective coating thickness in the range of one of the peaks, and applying the coating by low pressure CVD or a PECVD coater.

Once the coating has been formed, the filament tube is brazed to the ferrules and the lens is attached to the housing. This may be done with an adhesive and/or with heat or other suitable attachment technique.

Thicknesses of deposited films can be measured by ellipsometry.

While the lamp has been described with particular reference to incandescent lamps and halogen tungsten lamps, it should be appreciated that other light sources may also be utilized with the present invention, including ceramic metal halide lamps.

Additionally, other reflective coatings could be used in place of silver, including alloys of silver and other metals.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. A method of forming a lamp comprising:
   providing a reflective interior surface comprising:
      providing a layer of a reflective material, and
      providing a protective layer comprising at least one of an oxide of tantalum and an oxide of silicon in contact with the reflective layer which protects the layer of reflective material against oxidation and sulfide formation; and
   forming the lamp from the interior surface and a light source, a thickness of the protective layer being selected such that at least one of the following is satisfied:
   (a) a color correction temperature of the lamp is no more than 40 K less than a color correction temperature of the light source, and
   (b) a % reflectance of the reflective interior surface is no more than about 3% less than that of an equivalent reflective interior surface without the protective layer in a visible spectral range of 400-800 nm.

2. The method of claim 1, wherein both (a) and (b) are satisfied.

3. The method of claim 1, wherein the color correction temperature is no more than about 20 K less than that of the light source. source.

4. The method of claim 3, wherein the % reflectance of the reflective interior surface is at least 94.5% in the visible spectral range of 400-800 nm.

5. The method of claim 1, wherein the % reflectance of the reflective interior surface is no more than about 2.5% less than that of the layer of a reflective material in the visible spectral range of 400-800 nm.

6. The method of claim 5, wherein the layer of a reflective material has an average % reflectance of at least 90% in the visible range of the spectrum.

7. The method of claim 1, wherein the layer of reflective material comprises silver.

8. The method of claim 1, wherein the method further includes a tubulation step, the step of providing a reflective layer including:
forming the reflecting layer after the tubulation step.

9. The method of claim 1, wherein providing the protective layer includes depositing the layer by chemical vapor deposition on a housing.

10. The method of claim 1, wherein at least (a) is satisfied.

11. The method of claim 1, wherein the reflective layer comprises silver, the color correction temperature is no more than about 20 K less than that corresponding to a protective layer optical thickness of zero and the reflectance is no more than 3% less than that corresponding to an optical thickness of zero in the visible range of the spectrum.

12. A lamp formed by the method of claim 1.

13. A method of forming a lamp comprising:
providing a reflective interior surface comprising:
providing a layer of a reflective material, and
providing a protective layer which protects the layer of reflective material against oxidation and sulfide formation; and forming the lamp from the interior surface and a light source, a thickness of the protective layer being selected such that a color correction temperature of the lamp is greater than a color correction temperature of the light source.

14. A lamp formed by the method of claim 13.

15. A method of
forming a lamp comprising:
providing a reflective interior surface comprising:
providing a layer of a reflective material, and
providing a protective layer which protects the layer of reflective material against oxidation and sulfide formation, the protective layer comprising silica and having a thickness in one of the following ranges:
50-200Å; and
2600-3250 Å; and
forming the lamp from the interior surface and a light source.

16. A lamp formed by the method of claim 15.

17. A method of forming a lamp comprising:
providing a reflective interior surface comprising:
providing a layer of a reflective material, and
providing a protective layer which protects the layer of reflective material against oxidation and sulfide formation; and
forming the lamp from the interior surface and a light source, the protective layer having an optical thickness $t_{OPT}$ which satisfies the relationship:
$1.1(1+0.9n)$ quarterwavelengths $\leq t_{OPT} \leq 1.4(1+0.9n)$ quarterwavelengths
where n is an integer from 1 to 5;
whereby at least one of the following is satisfied:
(a) a color correction temperature of the lamp is no more than 40 K less than a color correction temperature of the light source, and
(b) a % reflectance of the reflective interior surface is no more than about 3% less than that of an equivalent reflective interior surface without the protective layer in a visible spectral range of 400-800 nm.

18. The method of claim 17, wherein the protective layer comprises at least one of the group consisting of:
oxides, suboxides, carbonated compounds and hydrogenated compounds of one or more of silicon, titanium, tantalum, zirconium, hafnium, niobium, aluminum, scandium, antimony, indium, and yttrium;
fluorides of one or more of magnesium, sodium, aluminum, yttrium, calcium, hafnium, lanthanum, ytterbium, and neodymium;
nitrides of one or more of silicon, aluminum, chromium, and titanium; and zinc sulfide.

19. The method of claim 18, wherein the protective layer includes at least one of an oxide of tantalum and an oxide of silicon.

20. A lamp formed by the method of claim 17.

21. A method of forming a lamp comprising:
providing a reflective surface which includes silver;
determining a first oscillating function when color correction temperature is plotted against optical thickness for a lamp formed from the reflective surface and a protective layer;
determining a second oscillating function when percent reflectance is plotted against optical thickness for a lamp formed from the reflective surface and a protective layer;
covering the reflective surface with a protective layer which is light transmissive, the optical thickness of the protective layer being selected, based on said oscillating functions, such that the following relationships are satisfied:
the color correction temperature is no more than about 20 K less than that corresponding to a protective layer optical thickness of zero; and
the reflectance is no more than 3% less than that corresponding to an optical thickness of zero in the visible range of the spectrum.

\* \* \* \* \*